United States Patent
Bauman et al.

(10) Patent No.: US 7,490,298 B2
(45) Date of Patent: Feb. 10, 2009

(54) CREATING DOCUMENTATION SCREENSHOTS ON DEMAND

(75) Inventors: Brian D. Bauman, Austin, TX (US);
Amanda J. Burton, Austin, TX (US);
Michael P. Carlson, Austin, TX (US);
Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 11/279,423

(22) Filed: Apr. 12, 2006

(65) Prior Publication Data

US 2007/0245339 A1      Oct. 18, 2007

(51) Int. Cl.
*G06F 15/00* (2006.01)
*G06F 13/00* (2006.01)

(52) U.S. Cl. ....................... 715/788; 715/815

(58) Field of Classification Search ......... 715/762–765, 715/788, 815, 798–801, 826, 810, 854, 723, 715/835, 838; 348/239
See application file for complete search history.

(56) References Cited

U.S. PATENT DOCUMENTS

2002/0063902 A1*   5/2002   Dow et al. ................. 358/302
2006/0036958 A1*   2/2006   Dreher ....................... 715/764

* cited by examiner

*Primary Examiner*—Kevin Nguyen
(74) *Attorney, Agent, or Firm*—Justin M. Dillon; Gregory K Goshorn; Greg Goshorn, P.C.

(57) ABSTRACT

Provided is a method for generating and updating screenshots within computer software documentation. The disclosed techniques enable software documentation to insert up-to-date screenshots either upon installation of the corresponding software, dynamically when the documentation is used, or in some combination of the two approaches. In one embodiment, the computing system or application detects when screenshots have been modified and regenerates screenshots within affected documentation. Documentation is created that includes text and macros. The macros provide for the inclusion of screenshots within the documentation. Each macro includes information about where an associated screenshot is to be captured, the steps necessary to capture the screenshot and the location within the documentation where the screenshot is displayed. Also included in association with the macros is configuration information necessary to generate the appropriate screenshot.

1 Claim, 5 Drawing Sheets

CREATING DOCUMENTATION SCREENSHOTS ON DEMAND

TECHNICAL FIELD

The present invention relates generally to computer documentation and, more specifically, to a method for rendering screenshots into computer documentation.

BACKGROUND OF THE INVENTION

For several decades computing systems and the software and applications that execute on computing systems have become both larger and increasingly complex. Although current software is able to perform much more complicated tasks than older software, the added complexity also often increases the difficulty of using the software. To facilitate the use of software, including the configuration and execution, most publishers provide documentation, which has also become more complex.

Without documentation, many software products might be unusable. Further, many software products are difficult to configure and run because of large numbers of possible customization options. One example of such options includes, but is not limited to, the ability to support multiple languages. In light of these issues, documentation becomes very difficult to write and publish. Developers and publishers are also motivated by a desire to control development schedules and costs.

Screenshots are often a critical component of documentation. Screenshots provide the end user with actual images, providing context that helps users better understand the documentation and make better use of the corresponding product. Because many applications are available in such a large number of languages, inclusion of screenshots, which are typically restricted to one language, is not as common as it otherwise would be. For example, in documentation associated with Microsoft Word, published by the Microsoft Corporation of Redmond, Wash., many included images are simply icons. Attempting to match an icon in a Help window with an icon on a large menu bar can be difficult. Having some context certainly helps, as long as the textual elements in the documentation match what the user is seeing. Additionally, the number of screenshots in documentation that needs to be translated into multiple languages can be limited by the costs associated with translation. Typically, labels and text require a new screenshot for each language.

Another issue is that documentation can become inaccurate if a User Interface (UI) and the corresponding screenshots are changed. In addition to updating text, Information Developers (IDs) must expend time and effort to update screenshots and get proper screenshots into corresponding user guides each time a UI is changed. Another documentation issue is that screenshots require more memory and disk space to store than text. Thus, documentation that includes screenshots consumes larger amounts of disk space after installation that documentation without.

There are several currently existing approaches to address the memory issues. One such solution is to separate the background of an image from the background image using layers and then reusing duplicate layers for different images. This solution is time consuming, often requires a graphics artist to render the images and provides a maintenance problem if screens change. Another approach is to not include screen captures in the documentation. This solution limits usability and useful life of the documentation.

With these issues in mind, what is needed is a technology that renders screen shots and inserts them into the documentation on demand, either dynamically, upon installation of the corresponding software or when the underlying software or configuration is modified. In this manner, documentation would remain up-to-date and could be stored in a more memory efficient manner than currently available.

SUMMARY OF THE INVENTION

Provided is a method for generating screenshots within computer software documentation. The disclosed techniques enable software documentation to insert up-to-date screen images, or "screenshots," upon installation of the corresponding software, dynamically when the documentation is used, when the underlying software or configuration is changed or some combination. In this manner, documentation remains up-to-date and is stored in a memory efficient manner.

Two approaches, i.e. screenshot insertion at installation and insertion at use, can be used together or individually. In other words, some documentation may insert screenshots at installation, other documentation may insert screenshots dynamically when the documentation is used, and some documentation may employ both approaches at different times depending upon the circumstances. The timing of screenshot capture may be determined by a user defined configuration option. The installation time approach is less efficient in terms of non-volatile memory usage but provides run-time performance benefits. The dynamic insertion approach saves memory space but imposes a runtime overhead. In one embodiment of the claimed subject matter, the computing system or documentation is able to detect when screenshots have been modified, such as when a new software service pack has been installed, and regenerate screenshots within affected documentation.

Documentation is created that includes text and macros. The macros provide for the inclusion of screenshots within the documentation. Each macro includes information about where an associated screenshot is to be captured, the steps necessary to capture the screenshot and the location within the documentation where the screenshot is displayed. Also included in association with the macros is configuration information necessary to generate the appropriate screenshot, e.g. a language which should be employed in conjunction with the screenshot. Of course, some information is specific to particular screenshots and other information, such as the language, is global to all screenshots and documentation corresponding to a particular user or computing system.

This summary is not intended as a comprehensive description of the claimed subject matter but, rather, is intended to provide a brief overview of some of the functionality associated therewith. Other systems, methods, functionality, features and advantages of the invention will be or will become apparent to one with skill in the art upon examination of the following figures and detailed description.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE FIGURES

Although described with particular reference to a Windows operating system and Word, both published by the Microsoft Corporation of Redmond, Wash., the claimed subject matter can be implemented in any information technology (IT) system in which up-to-date documentation is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for generating software documentation. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
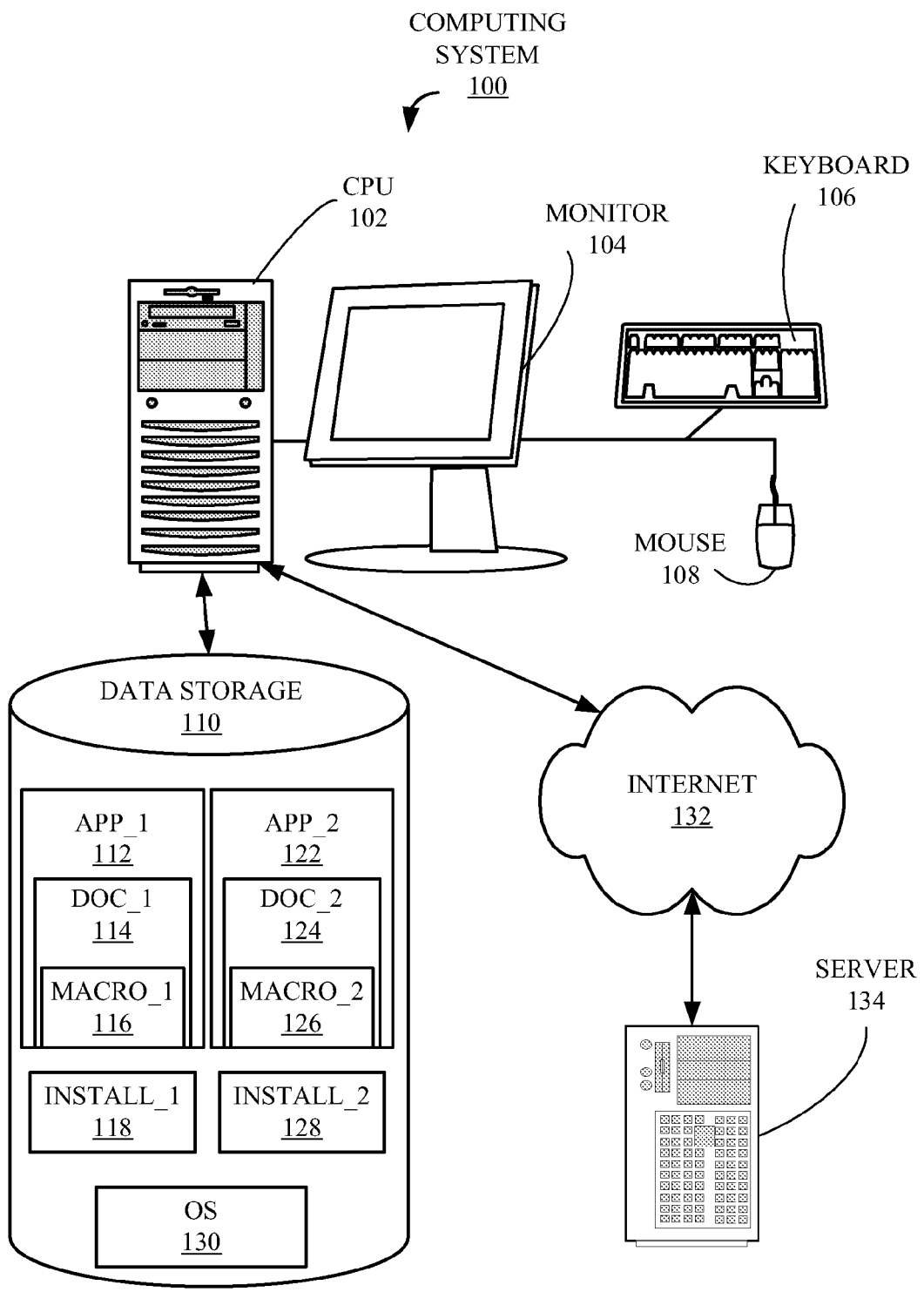
FIG. 1 is a block diagram of a computing system that implements the claimed subject matter.

Turning now to the figures, FIG. 1 is a block diagram of an exemplary computing system architecture 100 that incorporates the claimed subject matter. A central processing unit (CPU) 102 is coupled to a monitor 104, a keyboard 106 and a mouse 108, which together facilitate human interaction with CPU 102 and computing system 100. Attached to CPU 102 is a data storage component 110, which may either be incorporated into CPU 102 i.e. an internal device, or attached externally to CPU 102 by means of various, commonly available connection devices such as but not limited to, a universal serial bus (USB) port (not shown). Data storage 110 is illustrated storing several exemplary applications, including a first application, or "App_1," 112 and a second application, or "App_2," 122. Both App_1 112 and App_2 122 include corresponding documentation, or, in this example, a "Doc_1" 114 and a "Doc_2" 124 respectively. In accordance with the claimed subject matter, Doc_1 114 includes text (not shown) and a Macro_1 116 portion that stores macros, or code foe executing specific functions. In a similar fashion, Doc_2 124 includes a Macro_2 126. Although illustrated with a distinct macro section which stores macros referenced within the text of Doc_1 114 and Doc_2 124, Doc_1 114 and Doc_2 124 may simple include macros throughout their respective text. It should be noted that a typical computing system may include many applications, but for the sake of simplicity only two are shown.

Associated with App_1 112 is an installation script, or "Install_1," 118 and associated with App_2 122 is an installation script, "Install_2," 128. Install_1 118 and Install_2 128 are executed to install App_1 112 and App_2 122 and the corresponding documentation Doc_1 114 and Doc_2 124 onto computing system 100. Typically, the installation of a particular piece of software and the corresponding documentation involves such actions as the establishment of a directory corresponding to the software, uncompressing files associated with the software, copying the uncompressed files into the directory and the modification of a user interface to enable a user to access the software. In addition, according to the disclosed technology, documentation, e.g. Doc_1 114 and Doc_2 124, associated with the installed software is prepared and installed. The preparation and installation of documentation associated with software is explained in more detail below in conjunction with FIGS. 3-5. Current aspects of software installation on a computing system, i.e. aspects other than those techniques disclosed herein, should be familiar to those with skill in the computing arts.

CPU 102 is controlled by an operating system (OS) 130, which in this example includes a graphical user interface (GUI), a portion of which corresponding to App_1 112 is illustrated below in conjunction with FIG. 2. CPU 102 is connected to the Internet 132, which is also connected to a server computer 134. Although in this example, CPU 102 and server 134 are communicatively coupled via the Internet, they could also be coupled through any number of communication mediums such as, but not limited to, a local area network (LAN) (not shown). It should be understood that files such as App_1 112, Doc_1 114, App_2 122, Doc_2 124, Install_1 118 and Install_2 128, as well as many other files accessed by CPU 102 may be stored on memory (not shown) coupled to server 134 and delivered over a LAN or the Internet 132 to CPU 102 and/or data storage 110.

Figure 2:
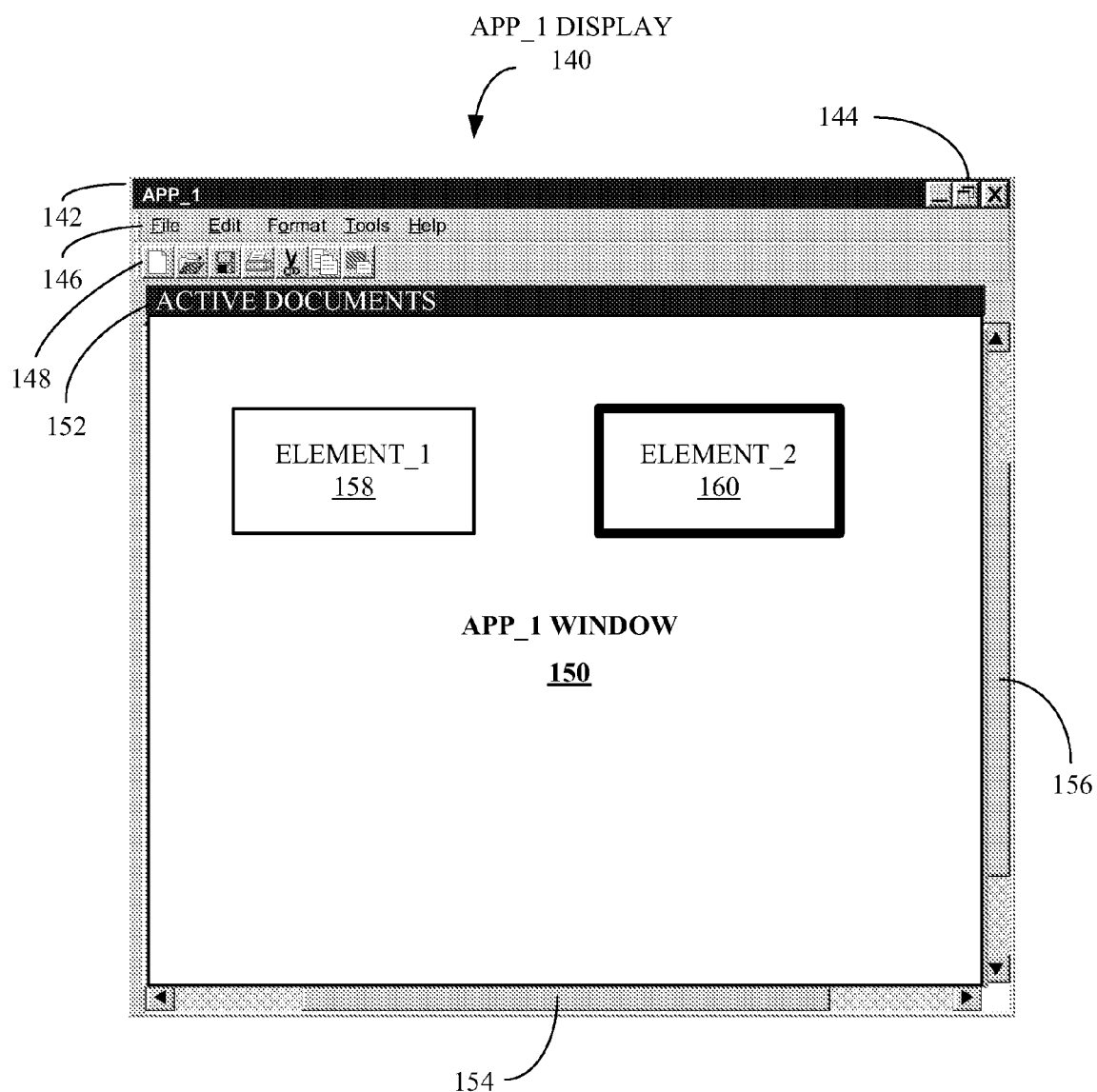
FIG. 2 is an exemplary application window that might be viewed in the display introduced in FIG. 1 and captured as a screenshot according to the claimed subject matter.

FIG. 2 is an illustration of an app_1 display 140, as viewed on monitor 104 (FIG. 1) of computer system 100 (FIG. 1). App_1 display 140 is employed throughout the remainder of this Description as an example of a display that might be captured as a screenshot and inserted into user documentation according to the claimed subject matter.

In this example, an App_1 display 140 is displayed in conjunction with a GUI displayed on monitor 104 (FIG. 1) during execution of App_1 112 (FIG. 1). Although with respect to the disclosed technology App_1 112 does not need to be any particular type of application, App_1 112 is described in the following examples as a word processing program. A title bar 142 displays the name of the corresponding application, i.e. App_1 112. Window control buttons 144 the operation of app_1 display 140. Buttons 144 enable a user to minimize, maximize and close app_1 display 140. Menu items 146 provide functionality associated app_1 112. Menu items include a "File" menu option, an "Edit" menu option, a "Format" menu option, a "Tools" menu option and a "Help" menu option. Help menu option is typically associated with corresponding documentation, or, in this example, Doc_1 114 (FIG. 1). It should be noted that in this example menu items 146 are displayed in the English language. In other implementations of App_1 112 menu items 146 may be displayed in another language. The choice of a particular language is based upon a particular configuration selected during the installation of App_1 112 (see FIG. 3).

Associated with each menu option is an input key combination or "hot key." The specific hot key associated with each menu option can be determined by noting which letter in the menu option is underlined. For example, the File menu option is displayed as "File," indicating that the letter 'F' is the corresponding hot key. Similarly, the Format menu option is displayed as "Format," indicating that the letter 'O' is the corresponding hot key. These hot key assignments are active when the focus in App_1 display 140 is on menu items 146 and are activated by pressing one of Alt keys (not shown) and a corresponding letter key (not shown) on keyboard 106 (FIG. 1). A hot key assignment, like a choice of language, is an example of a configurable option that can affect a particular screenshot.

Below Menu buttons 146 are several Toolbar buttons 148, which provide a user of app_1 112 with quick access to various features of App_1 112. The buttons 148 in this example represent the operations of creating a new document, opening a new file, saving a file, cutting text in a document, copy text in a document and pasting text into a document. Those with experience with typical word processing applications should be familiar with Toolbar buttons 148. Like language and a hot key assignment, the association of Toolbar buttons to particular icons is a configurable option.

An application window, or App_1 window 150, is illustrated in the main area of app_1 display 140. A title bar, or banner, 152 displays the name of App_1 window 150, i.e. "Active Documents." A horizontal slider bar 154 enables a user to reposition window 150 with respect to right and left. A vertical slider bar 156 enables a user to reposition window 150 with respect to up and down.

Within App_1 window 152 are two open documents, or elements: an "Element_1" 158 and an "Element_2" 160. In this example, Element_2 is the active element in window 150, i.e. the element that is the focus of any input currently directed to App_1 112 via window 150.

As should be familiar with those with skill in the computing arts, App_1 112 and the corresponding App_1 display 140 are only displayed on monitor 104 and thus available for use once App_1 112 has been installed on computing system 100 and executed on CPU 102. For App_1 112 to be installed, the corresponding installation script, or in this example Install_1 118, must be executed. The claimed subject matter addresses various process that occur when Install_1 118 is executed and/or the Help option is activated.

Figure 3:
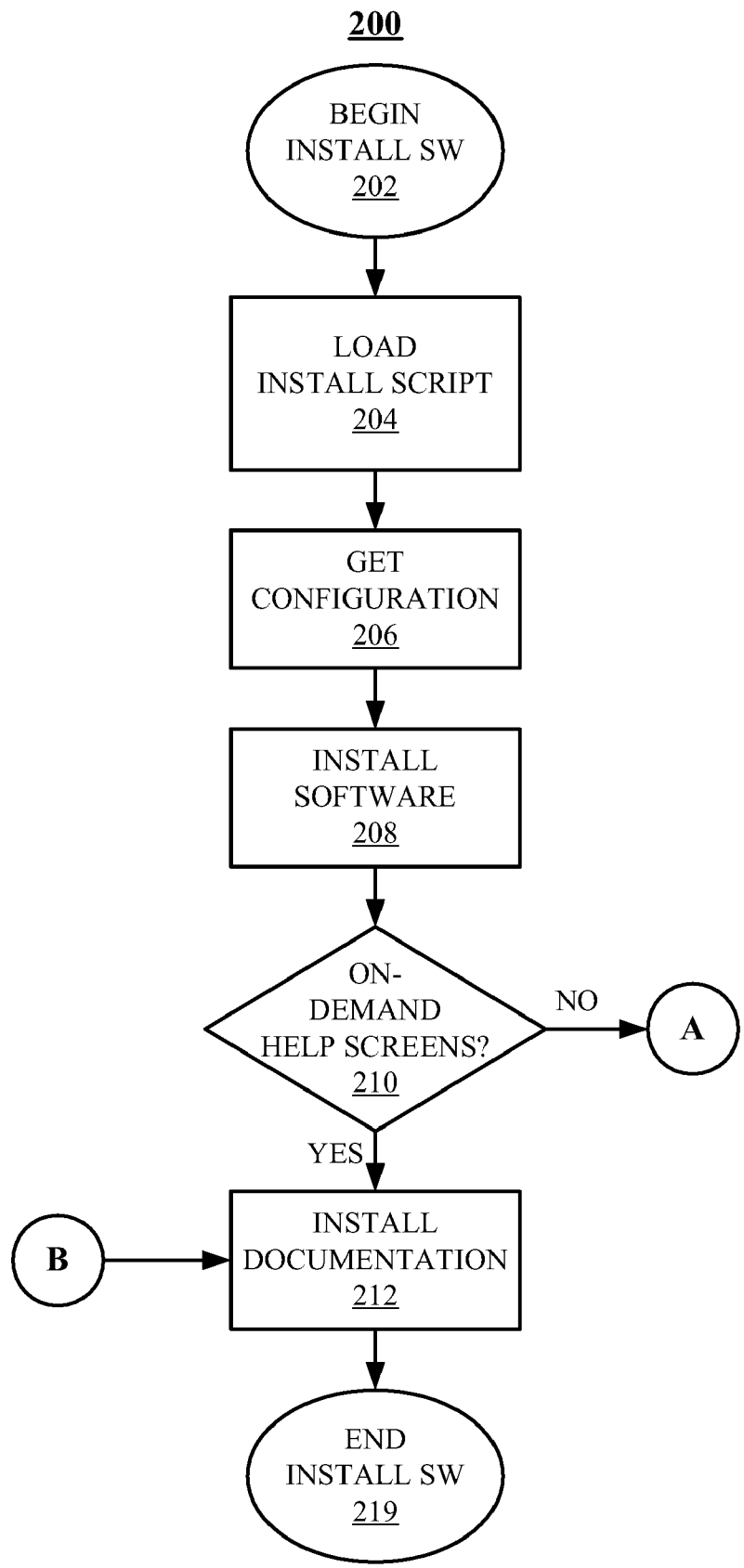
FIGS. 3 and 4 together represent a flowchart of an Install Software process that employs the claimed subject matter.
Figure 4:
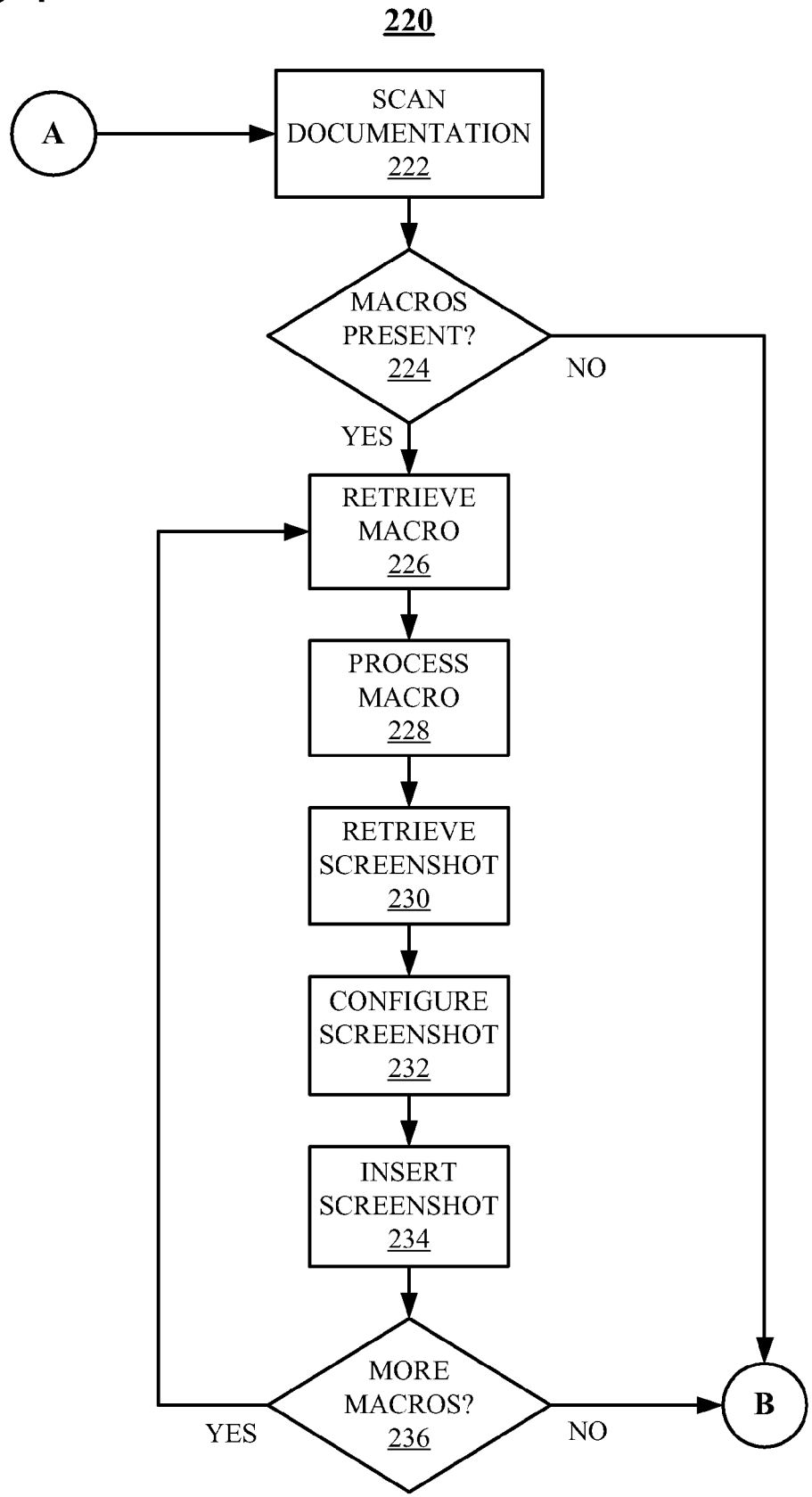

Together, FIGS. 3 and 4 represent a flowchart of an Install Software process 200 that implements the claimed subject matter. The following description utilizes App_1 112 (FIG. 1) as an example and the selection of the English language as a configuration option that impacts various displays such as App_1 display 140 (FIG. 2). It should be noted that App_1 112, App_1 display 140 and the English language are used as examples only and the claimed subject matter is equally applicable to any application and corresponding configuration options that may affect an applications displays, or screenshots.

In FIG. 3, process 200 starts in a "Begin Install Software (SW)" block 202 and control proceeds immediately to a "Load Install Script" block 204. During block 204, a user or system administrator of computing system 100 (FIG. 1) initiates the loading of App_1 112 (FIG. 1) by executing, or running, Install_1 118 (FIG. 1). During a "Get Configuration" block 206, process 200 displays a GUI (not shown) on monitor 104 (FIG. 1) and the user or system administrator who initiated the installation during block 204 is given the opportunity to enter various configuration options, such as but not limited to, the language that screens will utilize. In the alternative, configuration options may be entered as part of a text command that initiates Install_1 118 or retrieved from a pre-set configuration file (not shown) that is stored on data store 110 (FIG. 1) in conjunction with App_1 112 and/or OS 130 (FIG. 1).

Once configuration options have been specified during block 206, process 200 proceeds to an "Install Software" block 208. During block 208, process 200 installs App_1 112 on computing system 100. As explained above, the installation of App_1 112 involves a series of actions including, but not limited to, the establishment of a directory (not shown) corresponding to App_1 112 on data storage 110 (FIG. 1), uncompressing files associated with App_1 112, the copying of the uncompressed files into the directory and the modification of a user interface to enable a user to access App_1 112.

During an "On-Demand Help Screens?" block 210, process 200 determines whether or not App_1 112, which is designed to support the claimed subject matter, is configured to support on-demand screenshots or screenshots loaded during the installation procedure. If App_1 112 and corresponding Doc_1 114 are not configured to dynamically insert screenshots during execution of App_1 112 then process 200 proceeds to a transition point A, which leads to a portion 220 of process 200 described in more detail below in conjunction with FIG. 4. If App_1 112 is configured to dynamically insert screenshots into Doc_1 114 during execution, then process 200 proceeds from block 210 to an "Install Documentation" block 212 during which process 200 installs Doc_1 114, including text and the macros represented by Macro_1 116 (FIG. 1). The timing of the insertion of screenshots, i.e. whether at software installation of dynamically, may be determined by a user defined configuration option.

In the case in which block 212 is entered directly from block 210 rather than via a transition point B, particular pieces of code in Macro_1 116 are executed when corresponding documentation is displayed in conjunction with App_1 112 as explained below in conjunction with FIG. 5. If block 212 is entered via transition point B (see FIG. 4), code associated with Macro_1 116 has been executed and relevant screenshots are included in Doc_1 114 prior to the installation executed during block 212. Once Doc_1 114 is installed during block 212, process 200 proceeds to an "End Install SW" block 219 in which process 200 is complete.

FIG. 4 is a flowchart of a portion 220 of Install Software process 200 (FIG. 3) that is reached via transition point A (FIG. 3). From transition point A, process 200 proceeds to a "Scan Documentation" block 222 during which process 200 scans, in this example, Doc_1 114 for the presence of macros, which in this example are stored in Macro_1 116. During a "Macros Present?" block 224, process 200 determines whether or not Doc_1 114 includes macros. If so, process 200 proceeds to a "Retrieve Macro" block 226 during which process 200 get the first unprocessed macro in Macro_1 116. If, during block 224, process 200 determines that Doc_1 114 does not include macros associated with the claimed subject matter, control proceeds via transition point B to Install Documentation block 212 (FIG. 3) and processing continues as described above in conjunction with FIG. 3.

During a "Process Macro" block 228, process 200 determines the appropriate processing for the macro retrieved during block 226. Typically, process 200 determines the location of the corresponding, or designated, screenshot and extracts relevant configuration information from a configuration file (not shown) associated with App_1 112 (FIG. 1). As explained above in conjunction with Get Configuration block 206 (FIG. 3), a configuration options may be entered during block 206, entered as part of a text command that initiates Install_1 118 or retrieved from a pre-set configuration file stored on data storage 110 (FIG. 1) in conjunction with App_1 112 and/or OS 130 (FIG. 1).

During a "Retrieve Screenshot" block 230, process 200 retrieves the designated screenshot, in this example a screenshot corresponding to App_1 Display 140 (FIG. 2), from the location determined during block 228. During a "Configure Screenshot" block 232, process 200 reconfigures the screenshot retrieved during block 230 using configuration information determined during block 228. For example, the configuration information may include, but is not limited to, information regarding the language in which fields of the screenshot be rendered, specific hot key assignments for menu items 146 (FIG. 2), and particular icons to associate with toll bar buttons 148 (FIG. 2). For example, if the chosen language is Spanish rather than English, the "Help" menu item may be rendered as "Ayuda" with a corresponding modification in the hot key assignment. In this manner, maximum flexibility is able to be maintained for the documentation associated with App_1 112 and Doc_1 114 and memory is conserved because multiple screenshots associated with different possible configuration do not need to be saved in memory.

During an "Insert Screenshot" block 234, process 200 inserts the screenshot retrieved during block 230 and configured during block 232 into the documentation associated with App_1 11 and Doc_1 114. During a "More Macros?" block 236, process 200 determines whether or not there are more macros within Doc_1 that need to be executed. If so, process 200 returns to block 226, retrieves the next unprocessed macro and processing continues as described above. If process 200 determines during block 236 that there are no more macros to be processed, control proceeds via transition point B to Install Documentation block 212 (FIG. 3) and processing continues as described above in conjunction with FIG. 3.

Figure 5:
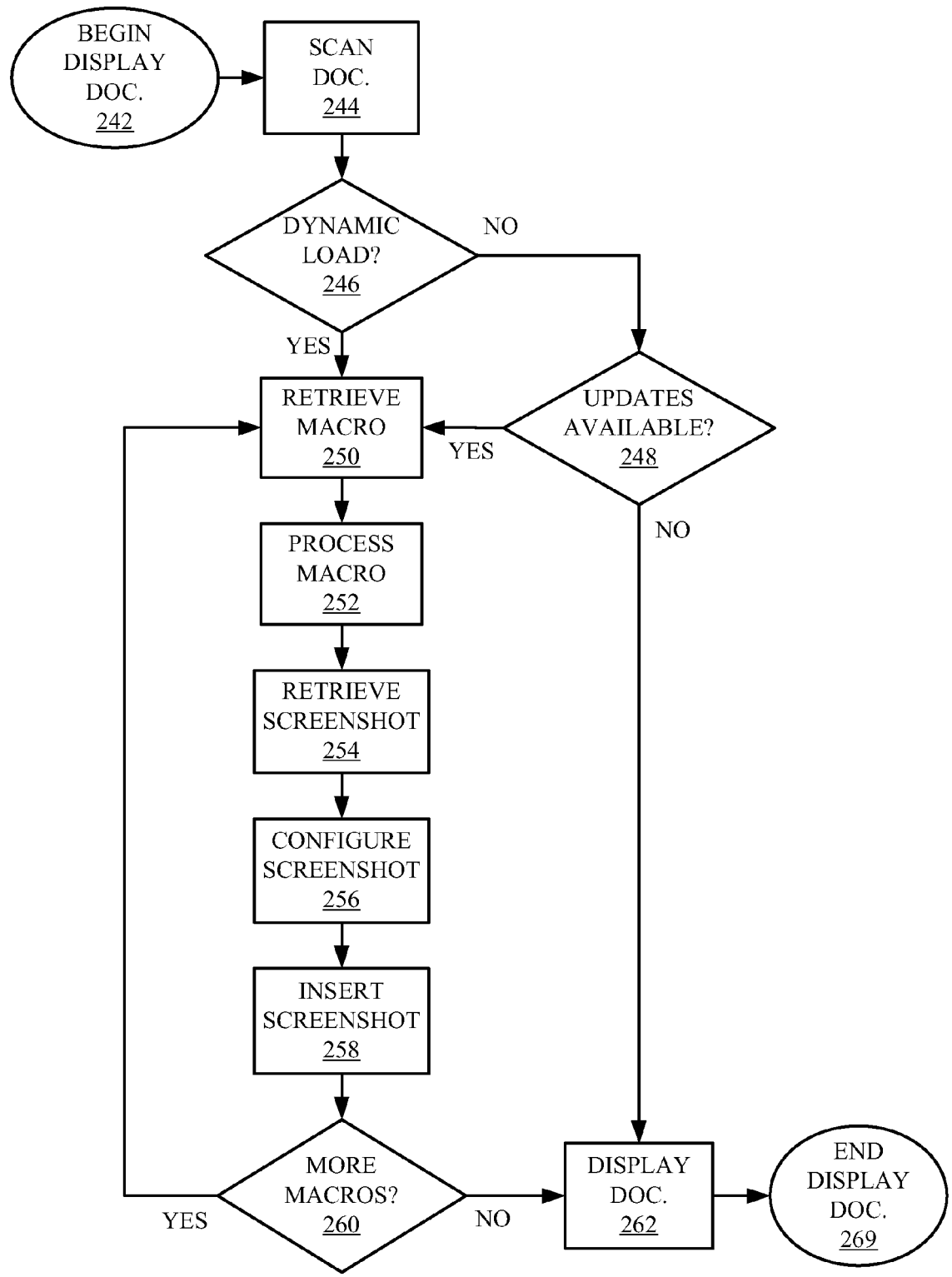
FIG. 5 is a flowchart of a Display Documentation process that employs an aspect of the claimed subject matter.

FIG. 5 is a flowchart of an exemplary Display Documentation process 240 that employs the claimed subject matter. Process 240 is executed when a user of, in this example, accesses documentation that incorporates the claimed subject matter, e.g. Doc_1 114 (FIG. 1) corresponding to App_1 112 (FIG. 1). Process 240 starts in a "Begin Display Document" block 242 and proceeds immediately to a proceeds to a "Scan Documentation" block 244 during which process 240 scans Doc_1 114, which has been accessed in the course of using App_1 112, for the presence of macros, either imbedded within the text of Doc_1 114 or stored in Macro_1 116 and referenced by pointers within the text.

During a "Dynamic Load?" block 246, process 240 determines whether or not App_1 112 and Doc_1 114 are configured for the dynamic loading of screenshots. As explained above in conjunction with FIGS. 3 and 4, an application that incorporates the claimed subject matter may have screenshots configured and loaded during installation of the application or dynamically load screenshots when the documentation is accessed. In the alternative, an application may use a combination of the two approaches, i.e. configuring and saving to memory screenshots during installation and then reconfiguring, saving to memory and loading screenshots when the application detects that a particular screenshot may have been altered. An "Updates Available?" block 248 corresponds to the alternative situation. In other words, process 240 determines during block 246 that App_1 112 configures and loads screenshots during installation and, during block 248, determines that Doc_1 114 has possibly been altered. In that case, control proceeds to a "Retrieve Macro" block 250, which is explained below. Examples of a situation in which documentation may have been altered include when process 240 determines that that a new service pack has been installed in conjunction with App_1 112. If, during block 246, process 240 determines that App_1 112, Doc_1 114 and App_1 Display 140 are configured for dynamic load, control proceeds to Retrieve Macro block 250, explained below. If, during block 248, process 240 determines that updates to Doc_1 114 have not been made, control proceeds to a "Display Document" block 262 during which the configured screenshot is displayed on monitor 104 (FIG. 1).

During Retrieve Macro block 250, process 240 get the first unprocessed macro in Macro_1 116 or the first macro imbedded within the text of Doc_1 114, depending upon the configuration of Doc_1 114. During a "Process Macro" block 252, process 240 determines the appropriate processing for the macro retrieved during block 250. Typically, process 240 determines the location of the corresponding, or designated, screenshot and extracts relevant configuration information from a configuration file (not shown) associated with App_1 112 (FIG. 1). As explained above in conjunction with Get Configuration block 206 (FIG. 3), a configuration options may be entered during block 206, entered as part of a text command that initiates App_1 112 or retrieved from a pre-set configuration file stored on data storage 110 (FIG. 1) in conjunction with App_1 112 and/or OS 130 (FIG. 1).

During a "Retrieve Screenshot" block 254, process 240 retrieves the designated screenshot form the location determined during block 252. During a "Configure Screenshot" block 256, process 240 reconfigures the screenshot retrieved during block 254 using configuration information determined during block 222. For example, the configuration information may include information regarding the language in which fields of the screenshot be rendered.

During an "Insert Screenshot" block 258, process 240 inserts the screenshot retrieved during block 254 and configured during block 256 into the documentation associated with App_1 11 and Doc_1 114. During a "More Macros?" block 260, process 240 determines whether or not there are more macros within Doc_1 that need to be executed. If so, process 240 returns to block 250, retrieves the next unprocessed macro and processing continues as described above. If process 240 determines during block 260 that there are no more macros to be processed, control proceeds Display Document block 262 and displays the configured screenshot in conjunction with the appropriate part of Doc_1 114. Finally, control proceeds to an "End Display Document" block 269 in which process 240 is complete.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for creating computer documentation on demand, comprising: embedding an indicator corresponding to a screen image in a documentation file; capturing a screen image corresponding to the embedded indicator at a time consistent with a configuration option, wherein the configuration option specifies whether the screen image capture is executed when the software corresponding to the documentation file is installed on a computing system, when documentation corresponding to the documentation file is loaded on the computing system, when the documentation file is accessed in conjunction with an execution of software corresponding to the documentation file and when detecting that software corresponding to the documentation file has been modified; storing the screen image in the documentation file at a location corresponding to the embedded indicator; and displaying the screen image in conjunction with the documentation file, wherein the screen image is displayed in conformity with parameters stored within a configuration file.

* * * * *